(No Model.)
E. BALLY & J. HARTMANN.
VELVET AND PLUSH EMBROIDERY.
No. 298,053. Patented May 6, 1884.
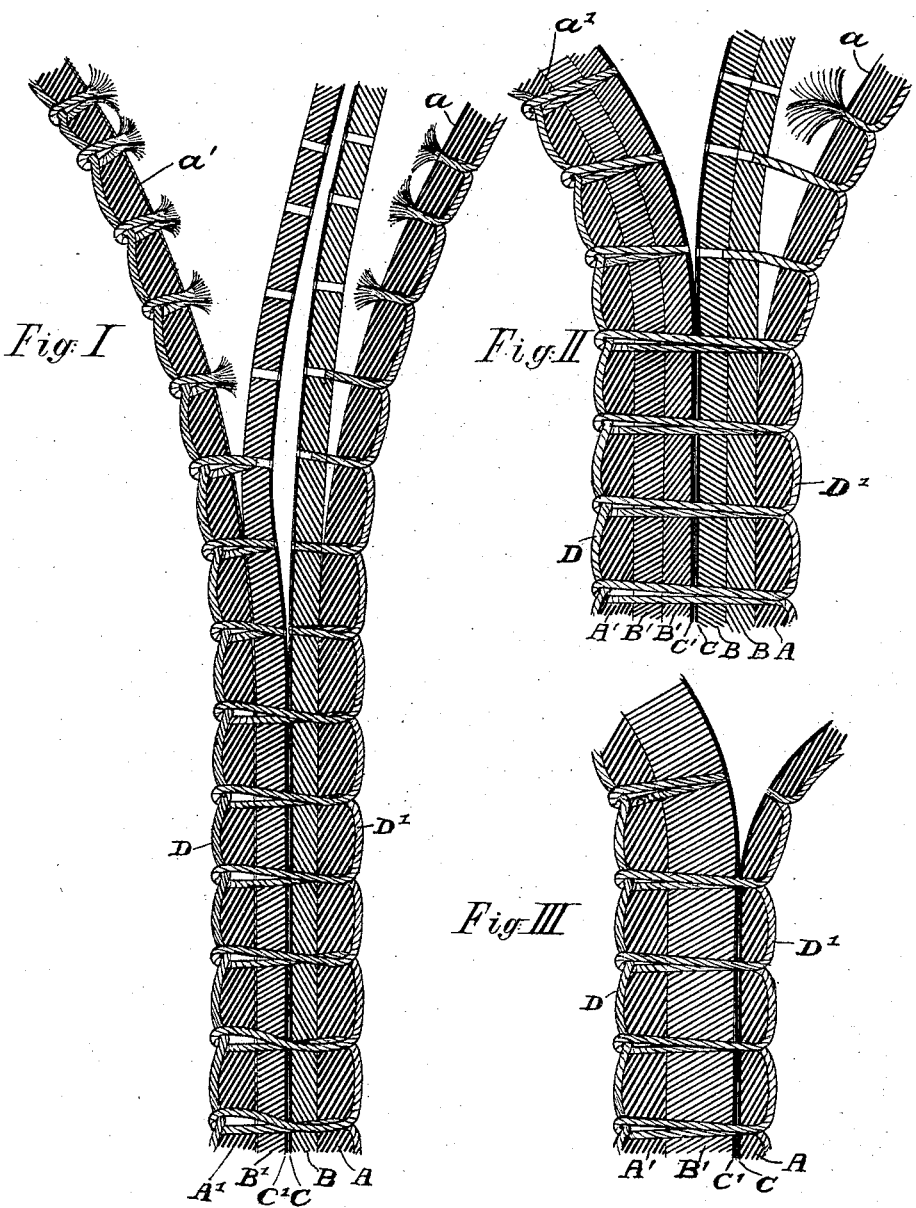

UNITED STATES PATENT OFFICE.

EDUARD BALLY, OF SCHÖNENWERD, AND JOHANN HARTMANN, OF SUHR, SWITZERLAND.

VELVET AND PLUSH EMBROIDERY.

SPECIFICATION forming part of Letters Patent No. 298,053, dated May 6, 1884.

Application filed October 13, 1883. (No model.) Patented in France July 7, 1883, No. 156,450.

*To all whom it may concern:*

Be it known that we, EDUARD BALLY and JOHANN HARTMANN, citizens of the Republic of Switzerland, residing, respectively, at Schönenwerd, State of Soleure, and at Suhr, State of Aargau, have invented certain new and useful Improvements in Proceeding for Velvet Embroidery, of which the following is a specification.

Our invention relates to certain new and useful improvements in velvet or plush embroidery on leather or cloth of any kind; and it consists in a novel contrivance for obtaining in an economical and easy way a good shag for plush or velvet embroidery. Two of the sheets of leather or cloth to be embroidered are put together with their face sides turned toward each other, and two or any even number of layers or sheets of leather, cloth, cartoon, or any material are put between the first two sheets in a thickness twice that of the length of the velvet nap or shag desired. Then the whole is kept well together, and, with regard to the embroidery, treated as one thickness or sheet and according to the respective design. The embroidering is done by means of a sewing-machine or the regular embroidering-machine, whereupon the pieces of cloth thus sewed together are separated by inserting a knife-blade at the middle or center joint between the intermediate layers of cartoon or leather or cloth, &c., and cutting the stitches. Said intermediate sheets previously put between the two sheets to be embroidered are taken off, which will not meet with any difficulty. Thus the cut threads of the single stitches will form a shag on the face sides of the two sheets to be embroidered, as in plush or velvet, and will have just the length of the thickness of half the intermediate sheets, and may be left as they are, may be pressed or ironed, and, if thought necessary, prevented from falling out by covering the back side of the embroidery with a coat of some gluey substance or paste.

In order to facilitate the cutting of the sheets, two additional intermediate layers of felt or other material are inserted at the joint to be cut open, and removed after the cutting, together with the other intermediate layers.

In the accompanying drawings, Figure I represents the two sheets to be embroidered, with two intermediate layers half cut open, the ordinary lock-stitch being used in the embroidering. Fig. II represents the same, but with four intermediate layers besides those needed for facilitating the cutting asunder of the sheets. Fig. III represents the contrivance applied in the case where only one sheet is to be covered with plush or velvet embroidery.

In Figs. I and II, A A' represent the pieces of leather, cloth, or felt, &c., to be covered with plush or velvet embroidery, and $a$ $a'$ are the face sides of said sheets whereon the embroidery has to appear. The sheets are put together with the face sides facing each other, and two layers, or an even number of layers, of felt, leather, or other material, B B', put between A A', the thickness of the layers varying according to the length of shag desired on the embroidery, and being, by counting all together, twice as thick as the length of shag to be obtained. Two thin additional intermediate layers, C C', are put between the layers B B', or B B and B' B', in order to facilitate afterward the inserting of a knife-blade between B B and B' B'. Then the embroidering is done by sewing all the sheets A A' B B B' B' C C' together as if they were one sheet, and afterward a knife-blade is inserted between C C' and the connecting stitches cut through, so as to separate A B C or A B B C from A' B' C' or A' B' B' C', and then the layers B B B' B' C C' may easily be taken off, and thus the face side of A A' will be covered with a shag forming the embroidery, said shag being left as it is or subjected to ironing, pressing, &c., according to wish, and forming a velvet or plush thus obtained by an easy and economical process. The back side of A A' may now be covered with a coat of glue or paste, in order to prevent the plush from falling out.

It will be observed that by applying the lock-stitch on the embroidery, as represented in Figs. I and II, two distinct and different kinds of velvet or plush will be obtained, A and A'. The back side of A' shows the interlocking thread D, but the back side of A the embroidering-thread D'; and in case the kind of velvet like A', with the interlocking thread, should be wanted, the arrangement may be made as illustrated in Fig. III, where only one sheet is covered with velvet or plush embroidery. Then A serves simply as auxiliary layer, in order to hold the stitches.

B' C' C are the intermediate layers, as in the case of Figs. I and II, and the sheet is parted between A and B or C and C'. The shag of plush or velvet on the face of A' will have the lengths of the thickness of layers B' and C' together, and may be treated as mentioned in the description of Figs. I and II.

This contrivance for obtaining plush embroidery is entirely new, and

What we claim, therefore, and want to secure by Letters Patent, is—

1. The process of producing velvet or plush embroidery, which consists, first, in ornamentally sewing together surface sheets of leather or cloth with intermediate layers of the same or other suitable fabric, then cutting the stitches between the intermediate layers, and then removing the intermediate layers, so as to have the projecting cut threads constitute a shag on the leather and cloth, and forming the embroidery design on each of the surface sheets.

2. Plush embroidery, substantially as shown and described, consisting of a cloth or leather sheet, A, having a shag or plush projecting above its face side, and said shag being held in position by lock-stitches, which stitches form said shag with the interlocking threads D on the back side of the cloth or leather.

3. In a new article of manufacture, the combination consisting of a sheet of leather or cloth with threads projecting therefrom, the shag of the threads forming an ornamental design, and the single thread or threads thereof being held by an interlocking thread on the back side of the cloth or leather sheet, and by a coating of paste or glue, the whole being constructed substantially as herein described.

In testimony whereof we hereunto sign our names, in the presence of two subscribing witnesses, this 28th day of July, 1883.

EDUARD BALLY.
JOHANN HARTMANN.

Witnesses:
EMIL BLUM,
MORITZ VEITH.